United States Patent [19]

Yagi et al.

[11] 4,370,353

[45] Jan. 25, 1983

[54] ACID-RESISTING WHIPPING CREAM POWDER AND PROCESS FOR PRODUCING THE SAME

[75] Inventors: Naoki Yagi, Suita; Kwang Y. Kim, Higashi Osaka; Tarushige Nakaji; Kazuuki Fujisaki, both of Yao, all of Japan

[73] Assignee: Minaminihon Rakuno Kyodo Kabushiki Kaisha, Miyazaki, Japan

[21] Appl. No.: 195,187

[22] Filed: Oct. 8, 1980

[30] Foreign Application Priority Data

Apr. 7, 1980 [JP] Japan ................................. 55-45969

[51] Int. Cl.$^3$ .............................................. A23L 1/19
[52] U.S. Cl. .................................... 426/570; 426/613; 426/456
[58] Field of Search ................ 426/564, 570, 613, 456

[56] References Cited

U.S. PATENT DOCUMENTS 3,423,211  1/1969  Miles, Jr. .............................. 426/570
3,495,990  2/1970  Kayser ................................. 426/570
4,107,343  8/1978  Petricca .............................. 426/570
4,199,608  4/1980  Gilmore .............................. 426/570

*Primary Examiner*—Jeanette M. Hunter
*Attorney, Agent, or Firm*—Stevens, Davis, Miller & Mosher

[57] ABSTRACT

An acid-resisting whipping cream powder which comprises sodium or calcium caseinate, a vehicle, a fat or oil, an acetylated monoglyceride and a cyclic phosphate and/or a polymer material. The acid-resisting whipping cream powder is easily reconstituted and incorporated with gas by whipping even under an acidic condition to give a whipped cream of rich volume. The cream powder is produced by dispersing or dissolving the caseinate and the vehicle in water or a liquid medium suitable for food and drink, adding thereto the fat or oil and the acetylated monoglyceride, emulsifying the mixture, adding thereto the cyclic phosphate and/or the polymer material, homogenizing the mixture and then spray-drying the homogenized mixture.

12 Claims, No Drawings

ACID-RESISTING WHIPPING CREAM POWDER AND PROCESS FOR PRODUCING THE SAME

The present invention relates to an acid-resisting whipping cream powder and a process for producing the same. The cream powder of the present invention is easily reconstituted and incorporated with gas by whipping even under an acidic condition to give a whipped cream of rich volume.

Usually, a whipped cream is made from fresh cream by whipping. Fresh cream is centrifuged from milk and is an O/W emulsion containing about 40% of milk fat. When fresh milk is whipped by a physical or mechanical operation, gas such as air, nitrogen or the like is incorporated into fresh milk to form stable bubbles or cells wherein fat globules are agglomerated around the surface of each bubble or cell. A cream of this phase is a whipped cream and is used as decoration of cakes, fillings of confections and the like.

However, when a whipped fresh cream is stirred with a sour material such as a fruit juice, a fermented milk or the like, the cream reduces volume thereof and separates therefrom water, and hence, it is unmarketable.

Thus, a whipped cream to be used together with such sour material is prepared from butter cream or a compounded cream in the form of a W/O emulsion containing about 85% of milk fat or other edible fats and oils having excellent acid resistance. However, since butter cream or the compounded cream is in the form of a W/O emulsion, melting in the mouth and the taste thereof are inferior to those of fresh cream which is in the form of an O/W emulsion. Therefore, it has been required to provide fresh cream having excellent acid resistance.

On the other hand, it is desirable that an O/W emulsion of a liquid cream such as fresh cream or the like is somewhat unstable since, when it is too stable, a whipped cream prepared from the liquid cream has inferior shaping properties. Because of this necessary unstable condition, a liquid cream increases in viscosity and forms agglomerates due to agitation during transportation, temperature change and the like. To eliminate these defects of a liquid cream, it has been also required to reduce the cream to powder.

Under these circumstances, as the results of the intensive study, the present inventors have found that a whipped cream having excellent whipping properties and shape retention even under an acidic condition can be prepared from a cream powder containing an acetylated monoglyceride as an emulsifying agent together with a cyclic phosphate and/or a polymer material as an agent for providing acid resistance to the cream.

One object of the present invention is to provide an acid-resisting whipping cream powder which has excellent whipping properties and shape retention even under an acidic condition when it is reconstituted. Another object of the present invention is to provide a novel process for producing an acid-resisting whipping cream powder. These and other objects as well as advantages of the present invention will become apparent to those skilled in the art from the following description.

According to the present invention, there is provided an acid-resisting whipping cream powder which comprises sodium or calcium caseinate, a vehicle, a fat or oil, an acetylated monoglyceride and a cyclic phosphate and/or a polymer material.

Sodium or calcium caseinate to be used in the present invention can be easily prepared by treating casein with an aqueous sodium or calcium hydroxide solution and is commercially available as water soluble casein.

As the vehicle, there can be used glucides such as lactose, dextrin or the like, which can be used alone or in a combination of two or more thereof. The amount of the vehicle is not critical, but it is usually used in a amount of 10 to 70% by weight based on the total weight of the powder obtained.

Examples of the fat or oil are milk fat and other edible fats and oils such as vegetable oils (e.g. palm oil, coconut oil, soybean oil, cottonseed oil etc.), which can be used alone or in a combination of two or more thereof. Particularly, it is preferable to use an edible hardened oil having a relatively high melting point such as 36° to 42° C. The amount of the fat or oil is not critical, but it is usually used in an amount of 30 to 80% by weight based on the total weight of the powder obtained.

The acetylated monoglyceride to be used in the present invention is an α-monoglyceride of a fatty acid having 16 to 18 carbon atoms, the hydroxy group bonded to γ-carbon atom of which is acetylated, and is represented by the formula:

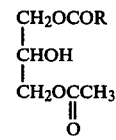

wherein R is an alkyl group having 15 to 17 carbon atoms. The acetylated monoglyceride can be used alone or in a combination two or more thereof. The acetylated monoglyceride can be prepared by a known method. For example, a partial glyceride is prepared from a saturated oil or fat such as cottonseed oil, lard or the like and the resulting glyceride is reacted with acetic anhydride or triacetin to obtain the desired acetylated monoglyceride. Particularly, the acetylated monoglyceride having a degree of acetylation of about 30 to 70% is preferable. Since the acetylated monoglyceride is used as an emulsifying agent, the suitable amount thereof may vary according to the fats and oils content of the powder obtained and it is preferable to use the acetylated monoglyceride in an amount of not less than 5% by weight based on the fats and oils content, particularly, 5 to 20% by weight in view of taste.

As the cyclic phosphate, particularly, sodium hexametaphosphate, sodium ultraphosphate (trade name: Ultraphoryphos) and phytic acid are preferable. Although the cyclic phosphate is one kind of polyphosphates, in the present invention, it should be differentiated from an acyclic polyphosphate such as sodium polyphosphate, sodium metaphosphate, sodium pyrophosphate or the like since the cyclic phosphate can provide acid resistance to the product even if it is used alone.

As the polymer material, there can be used polysaccharide derivatives such as alginic acid, chondroitin, chondroitin sulfuric acid, hyaluronic acid, teichuronic acid, colominic acid, λ-carrageenan, κ-carrageenan, charonin sulfate, polyribose phosphate, polyacetylgalactosamine phosphate, sodium alginate, carboxymethylcellulose, calcium cellulose glycolate, sodium cellulose glycolate, sodium starch glycolate and starch phosphate or sodium polyacrylate having a molecular weight of 40,000 to 120,000. Particularly, sodium alginate, carboxymethylcellulose and chondroitin sulfuric acid are preferable.

Since the cyclic phosphate and/or the polymer material are used as an agent for providing acid resistance to the above caseinate, the amount thereof is related to that of the caseinate and it is preferable to use the agent in an amount of 0.5 to 10% by weight based on the caseinate. 1 to 5% by weight of the agent is enough to provide sufficient acid resistance to the caseinate at pH value of about 4.5 under which a whipped cream prepared from the whipping cream powder of the present invention is usually used.

The cyclic phosphate and the polymer material can be used alone or in a combination of two or more thereof. It has been found that acid resistance is remarkably improved when one or a plurality of the cyclic phosphates are used together with one or plurality of the polymer materials, and hence, when they are combined as the agent for providing acid resistance to the caseinate, equal acid resistance can be obtained by using them in a half or less amount in comparison with that of using the cyclic phosphate or the polymer material alone.

Optionally, the acid-resisting whipping cream powder of the present invention may contain other ingredients derived from milk or a liquid cream, a powdered fruit juice and the like. Further, the cream powder of the present invention can contain additives such as a flavoring agent, a coloring agent, an acidulant and the like.

The acid-resisting whipping cream powder of the present invention can be produced by various processes. For example, the cream powder of the present invention can be simply produced by appropriately mixing the ingredients, or it can be produced by dispersing the caseinate, the vehicle and the fat or oil in water or a liquid medium suitable for food and drink such as milk, a liquid cream or the like, adding thereto the acetylated monoglyceride, homogenizing the resulting mixture under a pressure of 150 to 200 kg/cm² to reduce fat globules to not more than 1.5μ in size, spray-drying the homogenized mixture at an exhaust air temperature of not more than 75° C. to obtain powder and then mixing the powder with the cyclic phosphate and/or the polymer material.

However, it is preferable to produce the cream powder of the present invention by dispersing or dissolving the caseinate and the vehicle in water or a liquid medium suitable for food and drink, adding thereto the fat or oil and the acetylated monoglyceride, emulsifying the mixture, adding thereto the cyclic phosphate and/or the polymer material, homogenizing the mixture and then spray-drying the homogenized mixture.

Thus, the present invention also provide this latter process for producing the acid-resisting whipping cream powder.

When dispersing or dissolving the caseinate and the vehicle in water or a liquid medium suitable for food and drink such as milk, a liquid cream or the like, it is preferable to warm at 70° C. The concentration of the caseinate and the vehicle in water or the liquid medium is not critical, but usually, 10 to 30% is preferable.

When adding the fat or oil and the acetylated monoglyceride to the resulting dispersion or solution, it is also preferable to previously melt them by warming at about 70° C.

The emulsification of the resulting mixture is usually carried out by mechanical agitation, preferably, for 10 to 30 minutes. Although the cyclic phosphate and/or the polymer material is added after the emulsification, they may be also added during the emulsification.

It is preferable to sterilize the resulting mixture before the homogenization. The sterilization can be preferably carried out by HTST method such as at 120° for 3 seconds.

The homogenization can be usually carried out by a conventional method under a pressure of, preferably, 120 to 250 kg/cm². The homogenization can be also effected in two steps, firstly, under a pressure of 100 to 200 kg/cm², and then, under a pressure of 20 to 50 kg/cm². The fat globules in the resulting mixture is reduced to not more than 1.5μ in size by the homogenization which provides excellent characteristics to the cream powder obtained, for example, when the cream powder is reconstituted and whipped, the resulting whipped cream shows remarkable overrun and has excellent shape retention.

The homogenized mixture is then subjected to conventional spray drying. In order to decrease the amount of free fat in the powder obtained, it is preferable to carry out the spray drying at a hot air temperature of 100° to 120° C. and an exhaust air temperature of 40° to 70° C.

The acid-resisting whipping cream powder of the present invention can also be produced by treating the caseinate with the cyclic phosphate and/or the polymer material before the emulsification thereof with the fat or oil and the acetylated monoglyceride.

Thus, the present invention also provides a process for the acid-resisting whipping cream powder which comprises admixing the caseinate, the vehicle and the cyclic phosphate and/or the polymer material in water or a liquid medium suitable for food and drink, adding thereto the fat or oil and the acetylated monoglyceride, emulsifying the mixture, homogenizing the emulsified mixture and then spray-drying the homogenized mixture.

The acid-resisting whipping cream powder of the present invention can be used as decoration of cakes such as fancy cakes or the like and fillings of confections such as pie, tart, cookie or the like by reconstituting the powder with water, milk or the like and whipping the reconstituted cream according to a standard method.

The following examples further illustrate the present invention in detail but are not to be construed to limit the scope thereof. In the examples, all the "parts" are by weight unless otherwise stated.

EXAMPLE 1

| Ingredients | Parts |
|---|---|
| Cottonseed hardened oil (m.p. 35° C.) | 200 |
| Acetylated monoglyceride (degree of acetylation 30%; prepared from partial glyceride of oleic acid) | 20 |
| Milk | 400 |
| Sodium caseinate | 15 |
| Lactose | 34 |
| Phytic acid (50% solution) | 1.5 |
| Sodium hydroxide | 0.5 |

According to the formulation, firstly, milk was warmed to about 70° C. and admixed with the caseinate and lactose and then, added thereto a mixture of the oil and the acetylated monoglyceride which were previously melted by warming at about 70° C. To the resulting mixture was added phytic acid which was previously neutralized with sodium hydroxide and the mixture was emulsified for about 10 minutes.

After sterilization at 120° C. for 3 seconds, the emulsified mixture was homogenized, firstly, under the pressure of 180 kg/cm², and then, under the pressure of 30 kg/cm². The homogenized mixture was spray-dried at the hot air temperature of 120° C. and the exhaust air temperature of 65° C. The spray-dried powder thus obtained was further air-dried at 45° C. to give the acid-resisting whipping cream powder (moisture content: 2.0%).

EXAMPLE 2

| Ingredients | Parts |
| --- | --- |
| Cottonseed hardened oil (m.p. 38° C.) | 80 |
| Frozen cream (fat content 45%) | 150 |
| Acetylated monoglyceride (degree of acetylation 50%, prepared from partial glyceride of stearic acid) | 25 |
| Milk | 420 |
| Sodium caseinate | 15 |
| Dextrin | 30 |
| Phytic acid (50% solution) | 1.5 |
| Sodium hydroxide | 0.5 |
| Carboxymethylcellulose | 0.5 |

According to the same procedure as described in Example 1, the acid-resisting whipping cream powder was obtained.

EXAMPLE 3

| Ingredients | Parts |
| --- | --- |
| Cottonseed hardened oil (m.p. 38° C.) | 150 |
| Soybean hardened oil (m.p. 36° C.) | 50 |
| Acetylated monoglyceride (degree of acetylation 70%, prepared from partial glyceride of lauric acid) | 30 |
| Milk | 400 |
| Sodium caseinate | 15 |
| Lactose | 35 |
| Sodium hexametaphosphate | 1.0 |
| Sodium alginate | 1.0 |

According to the same procedure as described in Example 1, the acid-resisting whipping cream powder was obtained.

EXAMPLES 4 and 5

According to the same formulation and procedure as described in Example 1 except that sodium hexametaphosphate (0.75 part) or sodium ultraphosphate (0.75 part) was substituted for phytic acid (1.5 parts) and sodium hydroxide (0.5 part), an acid-resisting whipping cream powder was obtained.

EXAMPLES 6 to 8

According to the same formulation and procedure as described in Example 1 except that carboxymethylcellulose (0.5 part), sodium ultraphosphate (0.75 part) or chondroitin sulfuric acid (1.0 part) was substituted for phytic acid (1.5 parts) and sodium hydroxide (0.5 part), the acid-resisting whipping cream powder was obtained.

EXAMPLES 9 to 23

According to the same formulation and procedure as described in Example 1 except that alginic acid, chondroitin, hyaluronic acid, teichronic acid, colominic acid, λ-carrageenan, κ-carrageenan, charonin sulfate, polyribose phosphate, polyacetylgalactosamine phosphate, calcium cellulose glycolate, sodium cellulose glycolate, sodium starch glycolate, starch phosphate or sodium polyacrylate (0.75 part) was substituted for phytic acid (1.5 parts) and sodium hydroxide (0.5 part), the acid-resisting whipping cream powder was obtained.

EXAMPLE 24

According to the same formulation as described in Example 3 except that sodium ultraphosphate (1.0 part) and chondroitin sulfuric acid (1.0 part) were substituted for sodium hexametaphosphate (1.0 part) and sodium alginate (1.0 part), the acid-resisting whipping cream powder was obtained by the same procedure as in Example 1.

EXAMPLE 25

According to the same formulation as described in Example 1, firstly, milk was warmed to about 70° C. and admixed with the caseinate, lactose and phytic acid previously neutralized with sodium hydroxide. To the resulting mixture was added a mixture of the oil and the acetylated monoglyceride which were previously melted by warming at about 70° C. and emulsified for about 30 minutes.

After sterilization at 120° C. for 3 seconds, the emulsified mixture was homogenized, firstly, under the pressure of 150 kg/cm², and then, under the pressure of 30 kg/cm². The homogenized mixture was spray-dried at the hot air temperature of 115° C. and the exhaust air temperature of 60° C. The spray-dried powder thus obtained was further air-dried at 45° C. to give the acid-resisting whipping cream powder (moisture content: 3.0%).

EXAMPLES 26 to 33

According to the same procedure as described in Example 25, the acid resisting whipping cream powder was obtained by using the same formulation as described in any one of Examples 2 to 8.

Experiment 1

Acid resistance of the acid-resisting whipping cream powder obtained in Example 1 was evaluated as follows:

Sugar (20 parts) and water (120 parts) were added to the whipping cream powder (100 parts) and pH of the mixture was adjusted with citric acid. The resulting mixture was whipped by using a hand-mixer to obtain a whipped cream. Overrun, shape retention and overall evaluation of the resulting whipped cream at various pH values were evaluated.

Overrun (volume increase by whipping): Overrun was calculated as follows:

Overrun (%) = [(weight of the mixture of a certain volume before whipping/weight of the whipped cream of the same volume) − 1] × 100.

Shape retention: Decoration of cakes was prepared by using the whipped cream in an optimum whipping condition and allowed to stand at 20° C. for 20 hours. Shape retention of the decoration was graded as follows:

A: excellent shape retention;
B: somewhat getting out of shape;
C: inferior shape retention.

Overall evaluation (suitability as food): Taking into consideration of the results of panel tests for taste, overall evaluation was graded as follows:

A: very good;
B: good;
C: not so good;
D: bad.

The results are shown in Table 1.

TABLE 1

| pH | 5 | 4 | 3 | 2 | 1.5 |
|---|---|---|---|---|---|
| Overrun | 175 | 160 | 145 | 130 | 50 |
| Shape retention | A | A | B | B | C |
| Overall evaluation | A | A | B | C | D |

As is shown in Table 1, the cream prepared from the powder of the present invention has excellent acid resistance and can be whipped even at pH of about 2. Since the cream prepared from the powder of the present invention shows remarkable overrun and excellent shape retention at pH of about 4.5 under which the cream is usually used, the acid-resisting whipping cream powder of the present invention has high utility.

Similar results were obtained by using the powders of the other Examples which contain the cyclic phosphate or the polymer material alone as the agent for providing acid resistance to the caseinate.

Experiment 2

The same evaluation as described in Experiment 1 was repeated by using the acid-resisting whipping cream powders obtained in Examples 2 and 3. As a result, the whipped creams showed somewhat superior overrun and shape retention to those in Experiment 1. This fact shows that a combination of the cyclic phosphate and the polymer material is more preferable.

The invention being thus described in some examples may be varied in many ways. Such modifications are not to be regarded as a departure from the spirit and scope of the present invention. For example, milk was used as a liquid medium in the Examples set forth, but water can be also used as the liquid medium to obtain the acid-resisting whipping cream powder. Of course, when water is used as the liquid medium, ingredients derived from milk should be added so as to obtain a similar composition. Further, calcium caseinate can be substituted for sodium caseinate. Furthermore, a combination of a mixed hardened oil of coconut oil and palm oil and soybean hardened oil, a combination of palm kernel hardened oil and soybean hardened oil and a combination of highly hydrogenated coconut hardened oil and frozen cream can be substituted for cottonseed hardened oil, the combination of cottonseed hardened oil and soybean hardened oil and the combination of cottonseed hardened oil and frozen cream in the Examples set forth, respectively. Thus, the ingredients and the amount thereof can be appropriately changed and, according to the change, the conditions for homogenization and spray drying can be appropriately selected. All such modifications are intended to be included within the scope of the following claims.

What is claimed is:

1. An acid-resisting whipping cream powder which comprises a caseinate selected from the group consisting of sodium caseinate and calcium caseinate; 10 to 70% by weight of a vehicle selected from the group consisting of lactose and dextrin, based on the total weight of the powder; 30 to 80% by weight of a member selected from the group consisting of milk fat, palm oil, coconut oil, soybean oil, cottonseed oil and a hardened oil thereof, based on the total weight of the powder; 5 to 20% by weight of an acetylated monoglyceride, based on the content of the said group member; and 0.5 to 10% by weight of a cyclic phosphate selected from the group consisting of sodium hexametaphosphate, sodium ultraphosphate and phytic acid based on the caseinate.

2. An acid-resisting whipping cream powder according to claim 1, wherein the powder further contains a polymer material selected from the group consisting of alginic acid, chondroitin, chondroitin sulfuric acid, hyaluronic acid, teichuronic acid, colominic acid, λ-carrageenan, κ-carrageenan, charonin sulfate, polyribose phosphate, polyacetylgalactosamine phosphate, sodium alginate, carboxymethylcellulose, calcium cellulose glycolate, sodium cellulose glycolate, sodium starch glycolate, starch phosphate and sodium polyacrylate in such amount that the sum of the polymer material and the cyclic phosphate is 0.5 to 10% by weight based on the caseinate.

3. An acid-resisting whipping cream powder according to claim 2, wherein the polymer material is a member selected from the group consisting of sodium alginate, carboxymethylcellulose and chondroitin sulfuric acid.

4. An acid-resisting whipping cream powder according to claim 1 or 2, wherein the acetylated monoglyceride is an α-monoglyceride of a fatty acid having 16 to 18 carbon atoms, the hydroxy group bonded to γ-carbon atom of which is acetylated.

5. An acid-resisting whipping cream powder according to claim 4, wherein the acetylated monoglyceride has a degree of acetylation of about 50%.

6. A process for producing an acid-resisting whipping cream powder which comprises the steps of dispersing or dissolving a caseinate selected from the group consisting of sodium caseinate and calcium caseinate and 10 to 70% by weight of a vehicle selected from the group consisting of lactose and dextrin based on the total weight of the powder to be obtained in a concentration of 10 to 30% in water or a liquid medium suitable for food and drink; adding thereto 30 to 80% by weight of a fat or oil selected from the group consisting of milk fat, palm oil, coconut oil, soybean oil, cottonseed oil and a hardened oil thereof based on the total weight of the powder to be obtained and 5 to 20% by weight of an acetylated monoglyceride based on the fat and oil content of the powder to be obtained; agitating the resulting mixture of to form an emulsion; adding thereto 0.5 to 10% by weight of a cyclic phosphate selected from the group consisting of sodium hexametaphosphate, sodium ultraphosphate and phytic acid based on the caseinate; homogenizing the mixture at a pressure of 20 to 250 kg/cm$^2$; and then spray-drying the homogenized mixture at a hot air temperature of 100° to 120° C. and an exhaust air temperature of 40° to 70° C.

7. A process according to claim 6, wherein a polymer material selected from the group consisting of alginic acid, chondroitin, chondroitin sulfuric acid, hyaluronic acid, teichuronic acid, colominic acid, λ-carrageenan, κ-carrageenan, charonin sulfate, polyribose phosphate, poly-acetylgalactosamine phosphate, sodium alginate, carboxymethyl-cellulose, calcium cellulose glycolate, sodium cellulose glycolate, sodium starch glycolate, starch phosphate and sodium polyacrylate is further added together with the cyclic phosphate in such amount that the sum of the polymer material and the cyclic phosphate is 0.5 to 10% by weight based on the caseinate.

8. A process according to claim 7, wherein the polymer material is a member selected from the group consisting of sodium alginate, carboxymethylcellulose and chondroitin sulfuric acid.

9. A process according to claim 6 or 7, wherein the emulsified mixture is sterilized before the homogenization.

10. A process according to claim 6 or 7, wherein the cyclic phosphate or a mixture of the cyclic phosphate and the polymer material is added during the emulsification.

11. A process for producing an acid-resisting whipping cream powder which comprises the steps of admixing a caseinate selected from the group consisting of sodium caseinate and calcium caseinate, 10 to 70% by weight of a vehicle selected from the group consisting of lactose and dextrin based on the total weight of the powder to be obtained and 0.5 to 10% by weight of a cyclic phosphate selected from the group consisting of sodium hexametaphosphate, sodium ultraphosphate and phytic acid based on the caseinate in water or a liquid medium suitable for food and drink; adding thereto 30 to 80% by weight of a member selected from the group consisting of milk fat, palm oil, coconut oil, soybean oil, cottonseed oil and a hardened oil thereof based on the total weight of the powder to be obtained and 5 to 20% by weight of an acetylated monoglyceride based on the fat and oil content of the powder to be obtained; emulsifying the mixture by agitation; homogenizing the emulsified mixture at a pressure of 20 to 250 kg/cm$^2$; and then spray-drying the homogenized mixture at a hot air temperature of 100° to 120° C. and an exhaust air temperature of 40° to 70° C.

12. A process according to claim 11, wherein a polymer material selected from the group consisting of alginic acid, chondroitin, chondroitin sulfuric acid, hyaluronic acid, teichuronic acid, colominic acid, λ-carrageenan, κ-carrageenan, charonin sulfate, polyribose phosphate, polyacetylgalactosamine phosphate, sodium alginate, carboxymethylcellulose, calcium cellulose glycolate, sodium cellulose glycolate, sodium starch glycolate, starch phosphate and sodium polyacrylate is further added together with the cyclic phosphate in such amount that the sum of the polymer material and the cyclic phosphate is 0.5 to 10% by weight based on the caseinate.

* * * * *